March 11, 1952     T. W. STRINGFIELD     2,588,427
CONDENSER CHARGE REGULATION
Original Filed March 31, 1949
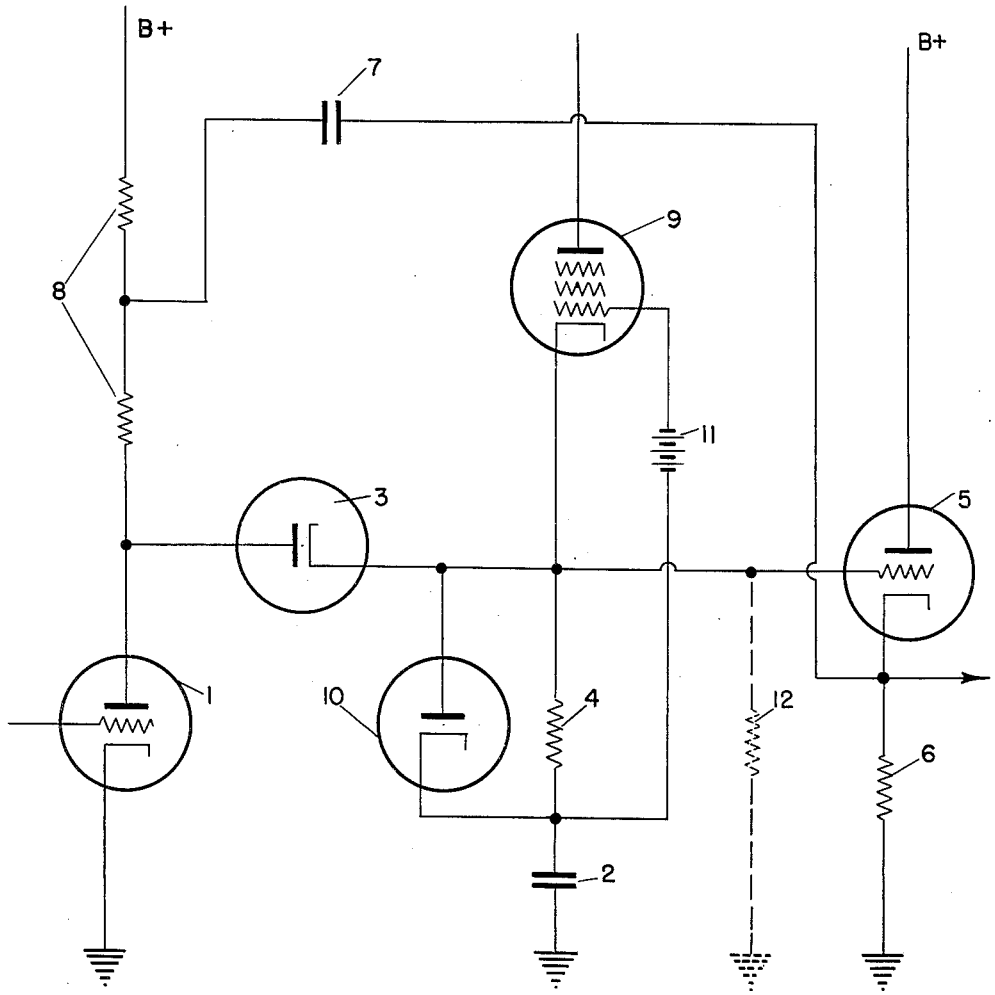
*INVENTOR.*
THEODORE W STRINGFIELD
BY
ATTORNEY Patented Mar. 11, 1952

2,588,427

UNITED STATES PATENT OFFICE 2,588,427

CONDENSER CHARGE REGULATION

Theodore W. Stringfield, Portland, Oreg., assignor to the United States of America as represented by the Secretary of the Interior Original application March 31, 1949, Serial No. 84,666. Divided and this application May 18, 1950, Serial No. 162,771

1 Claim. (Cl. 320—1)

(Granted under the act of March 3, 1883, as amended April 30, 1928; 370 O. G. 757)

The invention described herein may be manufactured and used by or for the Government of the United States for governmental purposes without the payment of any royalty thereon in accordance with the provisions of the act of March 3, 1883 (22 Stat. 625), as amended by the act of April 30, 1928 (45 Stat. 467, 35 U. S. C., 1946 Ed. Sec. 45).

This invention relates to the storage of energy in electrostatic condensers. In particular it relates to methods of storing regulated quantities of energy in condensers and of compensating for the conductivity of the insulation in the circuit to which the condenser is connected, thus preventing rapid leakage of current from the charged condenser. This application for patent is a division of pending application Serial No. 84,666 for patent on Electric Line Fault Locaters including only Figure 3 thereof.

An object of this invention is to delay the discharge of condensers in electric circuits after the condensers have been charged. A related object is to compensate for the inevitable conductivity which is characteristic of even the best of insulators in connection with charged condensers, and to decrease the so-called leakage current through or over the circuit insulation from charged condensers connected to the circuits. Another object is to permit the use of relatively poor insulation in condenser circuits while holding the condenser leakage discharge rate to a value that would otherwise be possible only with much better insulation.

Another object is to provide means for charging a condenser at a predetermined rate and relating the condenser charge to the length of time used in charging, and by delaying the condenser discharge to increase the accuracy of indication in comparison with the accuracy that would be had without leakage compensation.

What constitutes my present invention is set forth in the following specification in reference to the accompanying drawing and is succinctly defined in the appended claim.

Referring to the drawing, a thermionic vacuum tube 1 in response to any appropriate control voltage applied to the grid thereof regulates the rate of charging a condenser 2. In a typical practical situation, the grid of tube 1 is normally at zero bias so the plate thereof is virtually at ground potential. When a voltage is applied between the grid and cathode of tube 1, a voltage appears between the plate and cathode thereof. This voltage is applied to condenser 2 through a diode 3. Condenser 2 receives a charge at a rate proportional to the quotient of voltage of tube 1 minus the condenser voltage, divided by the resultant resistance of a resistor 4 in the circuit of condenser 2 and other circuit elements associated therewith. This proportionality of rate of charging departs from linearity if no compensation is applied.

Compensation to produce linearity is accomplished by using a second triode 5 with a cathode resistor 6 and a connection to the plate circuit of tube 1 through a condenser 7. A tapped resistor 8 is inserted in the plate lead of tube 1 for providing the appropriate division of voltage for condenser 7. This system of producing linearity in condenser charging rate is known in the related arts. Resistor 8 and condenser 2 are, when practicable, temperature compensated.

In the practical use of this circuit it is important that the rate of discharge of condenser 2 through leakage paths be decreased in order to give as much time as practicable for recording the condenser voltage as substantially the voltage to which the condenser had been charged. The delay in discharge is accomplished by an amplifying tube 9 and a diode 10 connected as shown to resistor 4. When condenser 2 is being charged by the action of tube 1, the cathode of diode 3 is positive with respect to ground, making the upper end of resistor 4 positive with respect to its lower end, and the upper terminal of condenser 2 positive with respect to ground. Diode 10 in parallel with resistor 4 permits current to flow in charging condenser 2 without such current being opposed by a severe voltage drop through resistor 4.

In discharging condenser 2, diode 10 is nonconducting so that the discharge current from condenser 2, makes the lower end of resistor 4 positive relative to the upper end.

Amplifier tube 9 is biased by a biasing battery 11 to zero plate current when condenser 2 is not discharging. When condenser 2 is discharging, the development of a difference of potential across resistor 4 makes the control grid of amplifier tube 9 sufficiently positive relative to the cathode thereof to permit the flow of plate current.

Plate current flow in tube 9 increases the potential of the upper end of resistor 4 relative to ground and so retards the escape of current from condenser 2. Expressed in another way, it may be said that tube 9 provides a current to ground in the leakage path normally followed by the current being discharged from condenser 2. The leakage path is represented by a resistor 12, shown as a broken line, across which in effect, the plate current of tube 9 develops a voltage which would be the same as that which would be produced by the current that would be flowing if the voltage on condenser 2 were much higher than it actually is. This opposes the flow of current from condenser 2 and, in consequence, delays the discharge thereof.

The circuit shown in the drawing comprises, as described above, three functional groups, the controlling amplifier, tube 1, the amplifier 5 for overcoming inherent non-linearity in the performance of the circuit and means, tube 9 and associated parts for delaying the leakage discharge of condenser 2. The circuit as a whole is a novel combination of three functional groups, one of which is novel in itself.

I claim:

An electric circuit for storing measurable quantities of electric energy comprising a first triode including a plate, cathode, and control grid, the plate of which is connected through a first resistor to a source of positive electrical potential, a condenser connected in series with a second resistor, a first diode and the plate-cathode path of said first triode, one terminal of said condenser being connected to the cathode of said first triode, the plate of said first diode being connected to the plate of said first triode, a second diode connected in shunt with said second resistor, the cathode of said second diode being connected to the junction of said second resistor and said condenser, a second triode including a plate, cathode and control electrode, the plate of said second triode being connected to a source of positive electrical potential, the cathode of said second triode being connected to ground through a load resistor, the control grid of said second triode being connected to the junction of said second resistor and said first and second diodes, a connection between the cathode of said second triode and a tap on the mid-portion of said first resistor, an electrical discharge device having at least a plate, cathode, and control grid, a connection from the control grid of said electrical discharged device to the junction of said second resistor and said first and second diodes, and means to normally bias the control grid of said electrical discharge device negatively.

THEODORE W. STRINGFIELD.

REFERENCES CITED

The following references are of record in the file of this patent:

UNITED STATES PATENTS

| Number | Name | Date |
|---|---|---|
| 2,113,011 | White | Apr. 5, 1938 |
| 2,377,757 | Clark | June 5, 1945 |
| 2,459,154 | England | Jan. 18, 1949 |